(12) United States Patent
Sandbulte et al.

(10) Patent No.: US 7,416,190 B2
(45) Date of Patent: Aug. 26, 2008

(54) AIR SUSPENSION SYSTEM FOR A VEHICLE

(76) Inventors: Arlin Gene Sandbulte, 10 6th St. NE., Sioux Center, IA (US) 51250; Craig Alan Jungjohan, 4199 440th St., Alton, IA (US) 51003; David Shane Vander Kooi, 1907 3rd Ave. SE., Sioux Center, IA (US) 51250

( * ) Notice: Subject to any disclaimer, the term of this patent is extended or adjusted under 35 U.S.C. 154(b) by 504 days.

(21) Appl. No.: 11/217,770

(22) Filed: Sep. 1, 2005

(65) Prior Publication Data
US 2007/0267840 A1 Nov. 22, 2007

(51) Int. Cl.
*B60G 17/04* (2006.01)
*B60G 17/052* (2006.01)

(52) U.S. Cl. .............. 280/6.151; 280/6.152; 280/6.157; 280/124.16

(58) Field of Classification Search .............. 280/6.151, 280/6.152, 6.157, 6.159, 5.514, 124.157, 280/124.158, 124.159, 124.16, 124.161
See application file for complete search history.

(56) References Cited

U.S. PATENT DOCUMENTS

| | | | | |
|---|---|---|---|---|
| 5,344,189 | A | 9/1994 | Tanaka et al. | ............... 280/840 |
| 5,466,007 | A * | 11/1995 | Smith | ...................... 280/6.157 |
| 6,834,873 | B1 | 12/2004 | Vander Kooi et al. | . 280/124.107 |
| 7,066,474 | B2 * | 6/2006 | Hiebert et al. | ........... 280/6.153 |
| 2005/0236792 | A1 * | 10/2005 | Hedenberg | ............. 280/124.11 |

* cited by examiner

*Primary Examiner*—Christopher Ellis
*Assistant Examiner*—Joseph Rocca
(74) *Attorney, Agent, or Firm*—Thomte Patent Law Office; Dennis L. Thomte

(57) ABSTRACT

An air suspension system for a load bearing vehicle which includes a pair of air springs fluidly connected to a pair of auxiliary air reservoirs and to a main air reservoir. The system includes control valves which permit the air in the air springs to be exhausted therefrom to lower the vehicle frame without exhausting the air from the auxiliary air reservoirs.

1 Claim, 4 Drawing Sheets

AIR SUSPENSION SYSTEM FOR A VEHICLE

BACKGROUND OF THE INVENTION

1. Field of the Invention

This invention relates to an air suspension system for a vehicle and more particularly to an air suspension system for a vehicle which is designed to permit one end of the vehicle to be lowered or kneeled. Even more particularly, the air suspension system of this invention permits the exhaust of air from the air springs of the suspension system, while preventing the exhaust of air from the auxiliary air reservoirs of the suspension system.

2. Description of the Related Art

Link Manufacturing, Ltd. ("Link") of Sioux Center, Iowa, markets an air suspension system under the trademark ULTRARIDE®. In the ULTRARIDE® system of Link Manufacturing, a pair of air springs are utilized to support the rear axle of the vehicle frame. In Link's prior art suspension system, the air may be exhausted from the air springs so that the rearward end of the vehicle frame may be lowered for loading purposes such as is desirable with shuttle buses, ambulances, etc. When the air springs are reenergized, the air compressor (the air source for the suspension system) may be unduly taxed which may potentially decrease its life. Further, in Link's prior art system, it takes some time to bring the vehicle to ride-height again which reduces the "drive away time," which creates problems in the EMS industry where "drive away time" is critical and the vehicle needs to return to ride-height quickly.

SUMMARY OF THE INVENTION

An air suspension system is described for a load-bearing vehicle including first and second longitudinally extending frame members with an axle positioned therebelow. The vehicle is provided with a source of air under pressure such as a compressor which supplies air to a main air reservoir or tank which in turn supplies air to a pair of air springs positioned between the frame members and the axle with the amount of air provided thereto being controlled by either a first height control valve or first and second height control valves. In one embodiment of this invention (FIG. 5), first and second auxiliary air reservoirs are mounted on the frame members with each of the auxiliary air reservoirs having inlet and outlet ends. First and second air dump valves are also provided with each of the air dump valves having a first port, a second port and an exhaust port. The first ports of the first and second air dump valves are in fluid communication with the outlet ends of the first and second auxiliary air reservoirs, respectively. The second ports of the first and second air dump valves are in fluid communication with the air inlet/outlet ports of the first and second air springs, respectively. Each of the first and second air dump valves are movable between first and second positions. The first and second air dump valves, when in their first position, permit fluid communication between the respective auxiliary air reservoirs and the inlet/outlet ends of the respective air springs by way of the first and second ports thereof. The exhaust port of each of the first and second air dump valves is closed when the air dump valves are in their first position. The air dump valves, when in their second position, permit the air in the respective air springs to be exhausted therefrom through the exhaust ports of the first and second air dump valves. The first ports of the first and second air dump valves are closed when the first and second air dump valves are in their second position.

When the air dump valves are moved to their second position so that air may be exhausted from the air springs to lower the vehicle frame, the air in the auxiliary air reservoirs is not exhausted to the atmosphere. When the air dump valves are in their first position, the auxiliary air reservoirs act as accumulators in conjunction with the air springs thereby lowering the spring rate of the system and improving the ride thereof.

The embodiment of FIG. 6 is substantially identical to the embodiment of FIG. 5 except that only a single height control valve is utilized.

In a further embodiment of the invention (FIGS. 3 and 4), first and second auxiliary air reservoirs are mounted on the frame members with each of the auxiliary air reservoirs having an inlet/outlet end. First and second control valves, having first and second ports, are also provided with the second ports thereof being connected to the inlet/outlet end of the auxiliary air reservoirs, respectively. The first ports of the control valves are in communication with a pair of air springs. The first and second control valves are movable between open and closed positions. In the embodiment of FIG. 3, first and second air dump valves, having a first port, a second port and an exhaust port are also provided. The first port of each of the air dump valves is connected to a height control valve with the second port of each of the air valves being operatively connected to the second port of the associated control valve and the inlet/outlet end of the air spring. In the embodiment of FIG. 3, each of the first and second air dump valves is movable between first and second positions. When the dump valves are in their first position, the control valves are in their open position. When the dump valves are in their second position, the control valves are in their closed position. The first and second control valves, when in their open position, permit fluid communication between the respective auxiliary air reservoirs and the inlet/outlet ends of the respective air springs by way of the first and second ports thereof. The exhaust ports of the first and second air dump valves are closed when the air dump valves are in their first position. The air dump valves, when in their second position, permit the air in the respective air springs to be exhausted therefrom through the exhaust ports of the first and second air dump valves. The first ports of the first and second air dump valves are closed and the control valves are in their closed position when the first and second air dump valves are in their second position.

In this embodiment, when the air dump valves are moved to their second position so that air may be exhausted from the air springs to lower the vehicle frame, the air in the auxiliary air reservoirs is not exhausted to the atmosphere since the control valves are in their closed position.

The embodiment of FIG. 4 is essentially the same as the embodiment of FIG. 3 except that a single air dump valve is utilized rather than a pair of air dump valves. When the dump valves are in their first position, in all of the embodiments of FIGS. 3, 4, 5 and 6, the auxiliary air reservoirs act as accumulators in conjunction with the air springs thereby lowering the spring rate of the system and improving the ride thereof.

It is therefore a principal object of the invention to provide an improved air suspension system for a vehicle.

A further object of the invention is to provide an air suspension system for a vehicle wherein the air in the air springs may be exhausted therefrom to lower the frame into a "kneeling" position without exhausting the air from auxiliary air tanks operatively connected to the air springs.

A further object of the invention is to provide an enhancement kit for Link Manufacturing's ULTRARIDE® air suspension systems.

These and other objects will be apparent to those skilled in the art.

DESCRIPTION OF THE PREFERRED EMBODIMENT

Figure 1:
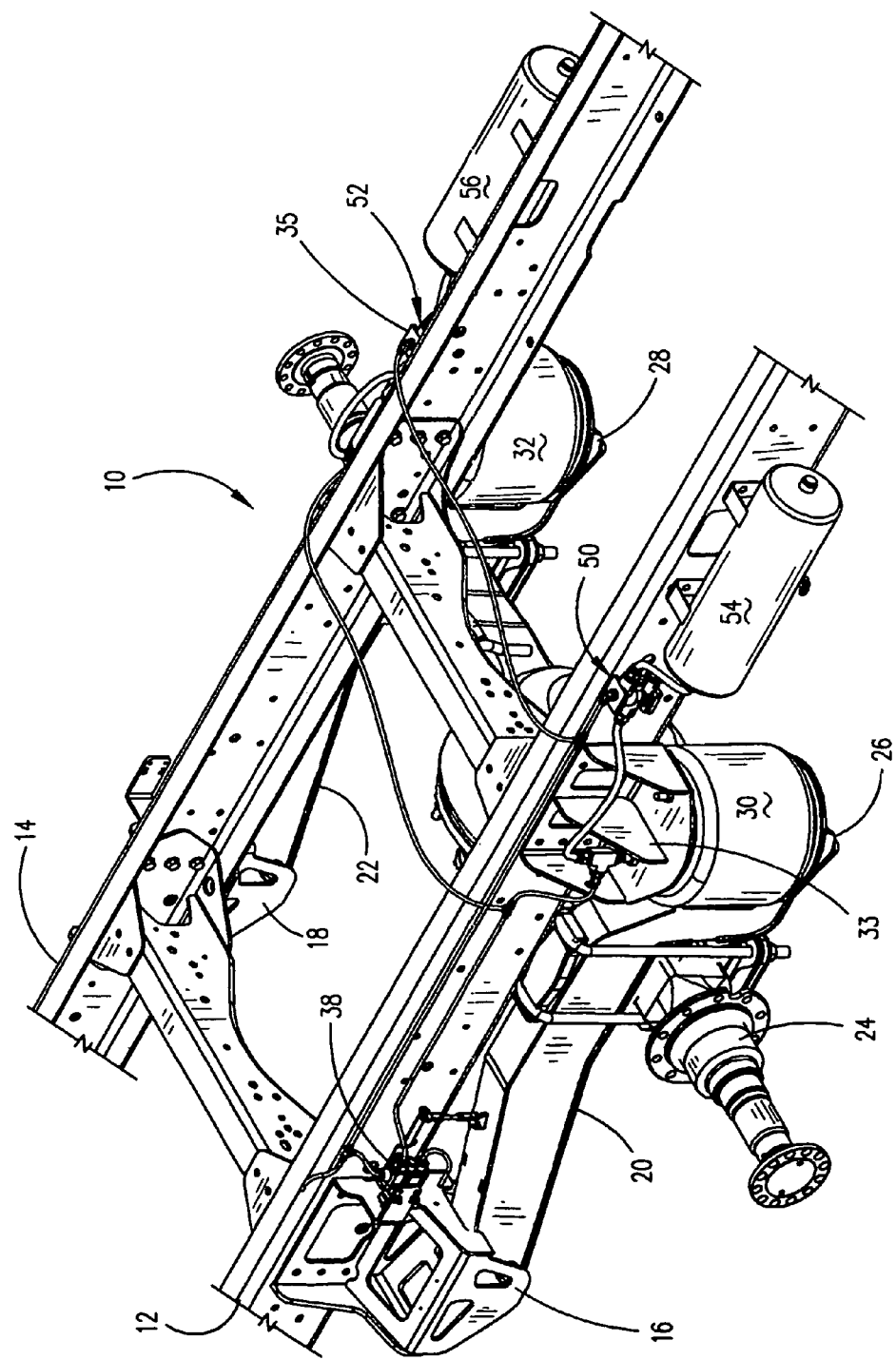
FIG. 1 is a partial perspective view of the vehicle frame having the air suspension system of this invention mounted thereon.
Figure 2:
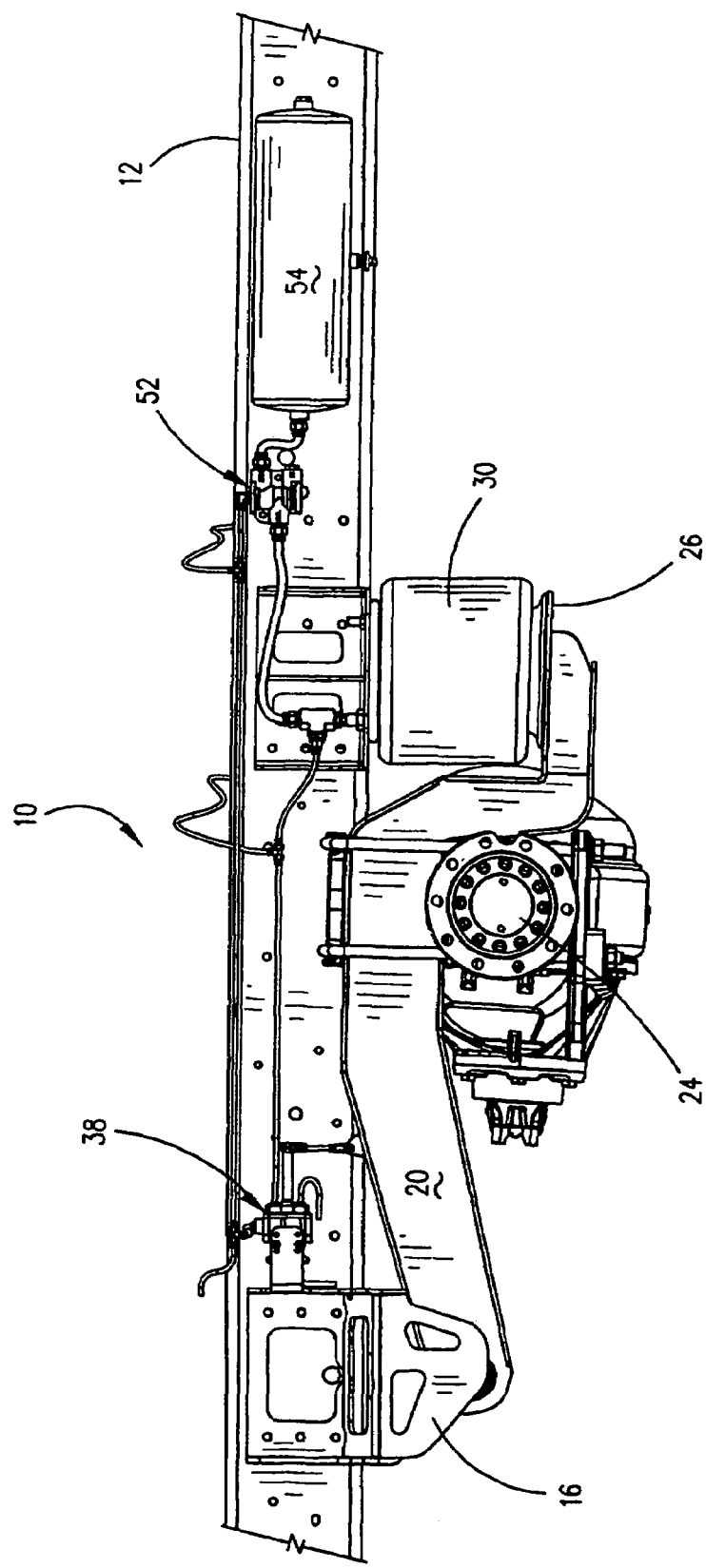
FIG. 2 is a side view of the suspension system of FIG. 1.

The numeral 10 refers generally to a vehicle such as a truck, ambulance, shuttle bus, bus, etc., with the vehicle 10 including a pair of longitudinally extending frame members 12 and 14, as illustrated in FIG. 1. Although the drawings herein illustrate the suspension system as being utilized on the rear of the vehicle, the suspension system could also be used at the forward end of the vehicle, if so desired. For purposes of illustration, FIG. 1 depicts the embodiment of FIG. 4 although the air dump valve is not shown. Although a particular air suspension system is shown in FIGS. 1 and 2, the system of this invention may be used on all suspension designs, not just the Link ULTRARIDE® suspension system.

In all the embodiments of FIGS. 3, 4 and 5, 6, mounting brackets 16 and 18 are secured to the frame members 12 and 14, respectively, forward of the rearward end thereof. Beams 20 and 22 are pivotally connected at their forward ends to the brackets 16 and 18, respectively, in conventional fashion. A transversely extending axle 24 is secured to the beams 20 and 22 forwardly of their rearward ends thereof, as illustrated in FIG. 1. The opposite ends of the axle 24 are adapted to have wheels mounted thereon in conventional fashion. The rearward ends of the beams 20 and 22 have supports 26 and 28 provided thereon, respectively, which have air springs 30 and 32 mounted thereon. The upper ends of the air springs 30 and 32 are secured to mounting brackets 33 and 35 which are secured to frame members 12 and 14 in conventional fashion. Air springs 30 and 32 have inlet/outlet ports 34 and 36 provided thereon, respectively, as will be described in more detail hereinafter.

Figure 3:
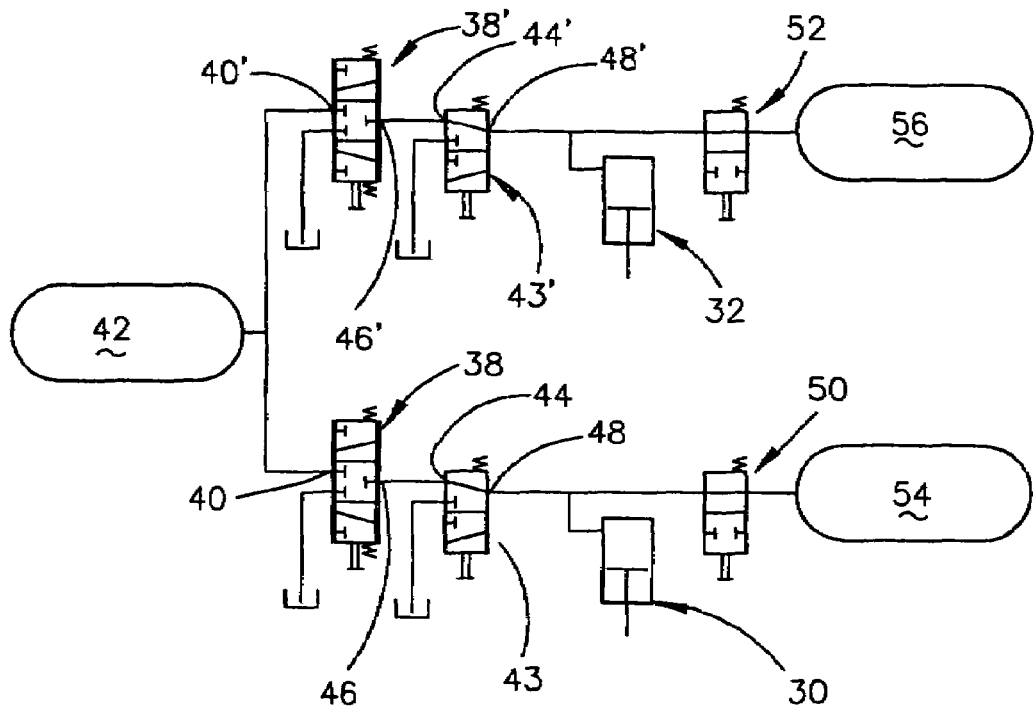
FIG. 3 is schematic of one embodiment of the system of this invention employing dual height control valves.
Figure 4:
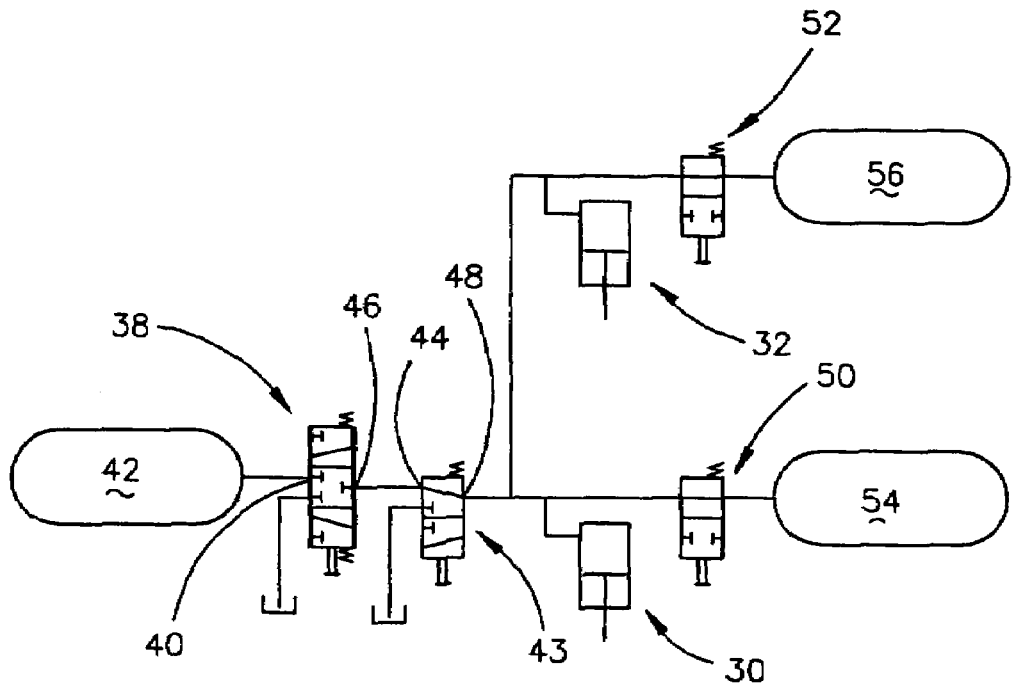
FIG. 4 is a schematic view of a second embodiment which is similar to that of FIG. 3 except that only a single height control valve is utilized.

In the embodiment of FIG. 4, a height control valve 38 is interconnected between the bracket 16 and the beam 20 and has its inlet port 40 in communication with the main air reservoir 42 which is filled with air under pressure by an air compressor. In the situations where a pair of dual height control systems are utilized (FIG. 3), a height control valve 38' is also utilized with the intake port 40' thereof being connected to the air supply reservoir 42. In the single height control embodiment of FIG. 4, a dump valve 43, which is movable between first and second positions, has its inlet port 44 in fluid communication with the outlet port 46 of height control valve 38. In the dual height control system of FIG. 3, a second dump valve 43' is utilized with the inlet port 44' thereof being in communication with the outlet port 46' of height control valve 38'. Each of the dump valves 43 and 43' are movable between first and second positions.

In the single height control system, as illustrated in FIG. 4, the outlet port 48 of dump valve 43 is in communication with the air springs 30 and 32 and control valves 50 and 52, with the control valves 50 and 52 being fluidly connected to auxiliary reservoirs 54 and 56, respectively. The control valves 50 and 52 are automatically movable between open and closed positions.

In the dual height control system of FIG. 3, the outlet port 48' of dump valve 43' is fluidly connected to the air spring 32 and the control valve 52, with the control valve 52 being connected to the auxiliary reservoir 56. When the dump valves 43 and 43' are in their first positions, the control valves 50 and 52 are in their open position. When the dump valves 43 and 43' are in their second positions, the control valves 50 and 52 are in their closed position. When the dump valves 43 and 43' are in their first position, air flows from the height control valve or valves, through the dump valves 43 and 43', and into the air springs 30 and 32. When the dump valves 43 and 43' are in their second position, air from the air springs 30 and 32 is exhausted to the atmosphere by way of the exhaust ports thereof.

In the single height control system of FIG. 4, when it is desired to dump the air from air springs 30 and 32 so that the frame of the vehicle may be lowered, the dump valve 43 is moved to its second position so that the air from the air springs 30 and 32 is dumped from the system through the exhaust port of the dump valve 43. Control valves 50 and 52 are automatically closed which prevents the air in the auxiliary air reservoir from being dumped to the atmosphere. When it is desired to again raise the frame, the dump valve is moved to its first position and the air compressor supplying air to the air supply reservoir 42 is actuated to supply air to the air springs 30 and 32 if sufficient pressure is not present in the air supply reservoir. The dual height control system illustrated in FIG. 3 functions in the same manner as just described for the single height control system of FIG. 4 with the exception being that two height control valves and two dump valves are utilized.

Figure 5:
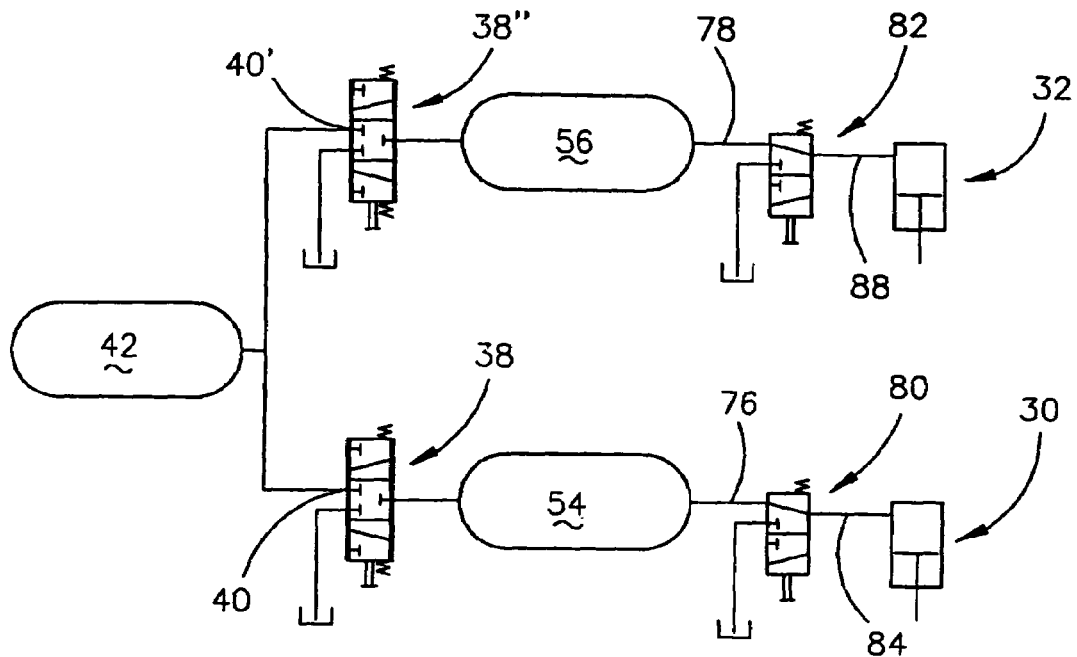
FIG. 5 is a schematic of the suspension system of a third embodiment of this invention which utilizes a pair of height control valves and a pair of control valves.
Figure 6:
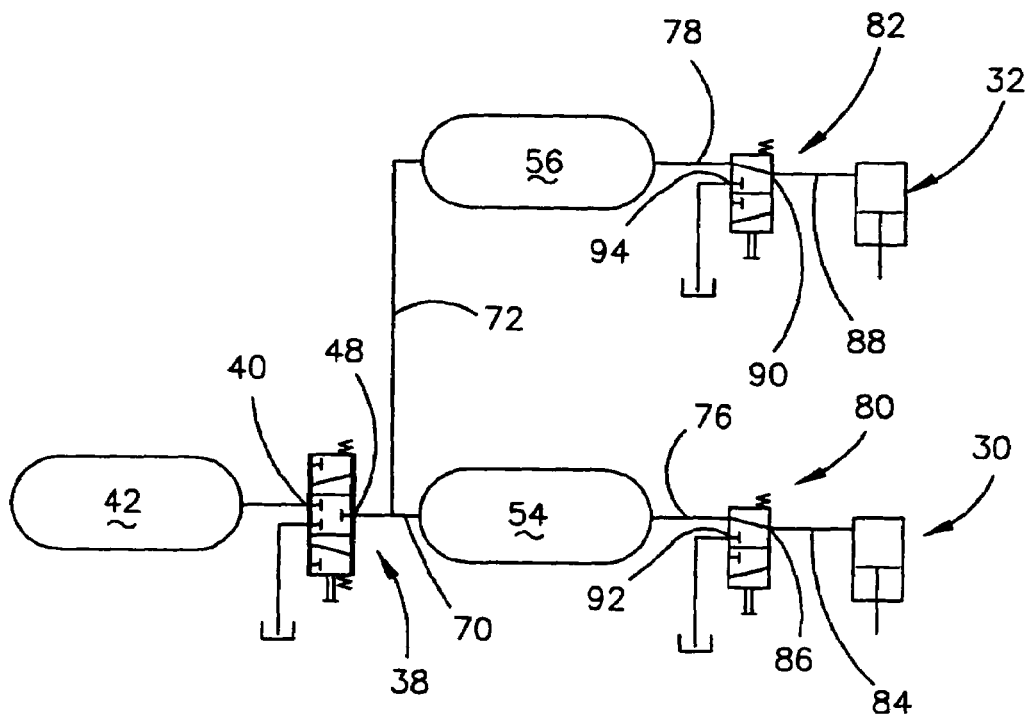
FIG. 6 is a schematic view of a fourth embodiment which is similar to that of FIG. 5 except that the system therein utilizes only a single height control valve.

FIGS. 5 and 6 illustrate further embodiments which are also designed to improve the recovery time after air has been dumped from the air springs. FIGS. 1, 2 and 6 illustrate a single height control system of this invention including a height control valve 38 having an inlet port 40 connected to air supply reservoir 42. The outlet port 48 of height control valve 38 is fluidly connected to auxiliary reservoirs 54 and 56. Line 70 extends from height control valve 38 to auxiliary reservoir 54 to fluidly connect the same. Line 72 is tapped into line 70 and supplies air to the auxiliary reservoir 56. Large diameter air lines 76 and 78 fluidly connect auxiliary reservoirs 54 and 56 to three-way dump valves 80 and 82, respectively. A large diameter line 84 fluidly connects the outlet port 86 of the dump valve 80 to the air spring 30. A large diameter line 88 connects the outlet port 90 of dump valve 82 to air spring 32.

Each of the dump valves 80 and 82 are movable between two positions. When the dump valves are in the first position, as illustrated in FIG. 6, the auxiliary reservoir 54 and the main air supply reservoir 42 supply air under pressure to the air spring 30 through the large diameter air lines 76 and 84 positioned on opposite sides of the dump valve 80. When the dump valve 80 is in its first position, as illustrated in FIG. 6, the exhaust port 92 thereof is closed. Similarly, when the dump valve 82 is in the first position illustrated in FIG. 6, the air supply reservoir 42 and auxiliary reservoir 56 supply air under pressure to the air spring 32 through the large diameter air line 78, valve 82 and large diameter air line 88. In the position illustrated in FIG. 6, the auxiliary reservoirs 54 and 56 act as accumulators in conjunction with the air springs 54 and 56, thereby lowering the spring rate of the system and improving the ride. It is recommended that the auxiliary reservoirs 54 and 56 be placed in close proximity to the air springs 30 and 32, respectively, in order to achieve the most benefit of the system. It is also recommended that the air lines 76, 84, 78 and 88 be large diameter air lines so that they do not restrict the flow of air between the air springs and the reservoirs. When the dump valve 82 is in its first position illustrated in FIG. 6, the exhaust port 94 of dump valve 82 is in its closed position.

When it is desired to dump the air from air springs 30 and 32 so that the frame may be lowered with respect to the ground, the dump valves 80 and 82 are operated so as to move the same from their first position to their second position. When the dump valves 80 and 82, respectively, are in their second position, the air flows from the air springs 30 and 32 through the valves 80 and 82 and out the exhaust ports 92 and 94 thereof, respectively. When the dump valves 80 and 82 are in their second position, the inlet ports of the dump valves 80 and 82 are in their closed position so that the air in the auxiliary reservoirs is not dumped therefrom. When it is desired to again raise the frame, the dump valves 80 and 82 are moved to their first position so that air again may be delivered to the air springs 30 and 32. The fact that the auxiliary reservoirs 54 and 56 are not dumped when the dump valves 80 and 82 are moved to their second or dumping position, enables air to be quickly supplied to the air springs 30 and 32. As stated, upon reenergizing the air springs, air from the main air reservoir 42 flows through the height control valve 38 and into the air springs 30 and 32 until the vehicle achieves the correct ride height, as controlled by the height control valve 38.

The dual height control system of the embodiment of FIG. 5 functions essentially the same as the single height control system of FIG. 6 except that a second height control valve 38' is plumbed or connected to the auxiliary reservoir 56. The dump valves 80, 82 and the air springs 30, 32 in the embodiment of FIG. 5 are identical to that described with respect to the embodiment of FIG. 6.

The control valves 50 and 52 in either embodiment may be either an air piloted valve, solenoid valve, pressure protection valve, or any other type of control device which enables the air in the auxiliary reservoirs 54, 56 to be isolated from the air springs 30, 32. This operation improves compressor life, and also provides an initial boost to the air springs when they are returning to ride height. The initial air flow to the air springs is especially important for the EMS industry where "drive away time" is critical and the vehicle needs to return to ride height quickly. In all of the embodiments, the reservoirs 54 and 56 act as accumulators in conjunction with the air springs 30 and 32, thereby lowering the spring rate of the system and improving the ride.

Thus it can be seen that the invention accomplishes at least all of its stated objectives.

We claim:

1. An air suspension system for a load-bearing vehicle including first and second frame members with an axle positioned therebelow, the vehicle also including a source of air under pressure, comprising:

a first air spring, having an air inlet/outlet port, positioned between the first frame member and the axle therebelow;

a second air spring, having an air inlet/outlet port, positioned between the second frame member and the axle therebelow;

a first auxiliary air reservoir having an air inlet/outlet end;

a second auxiliary air reservoir having an air inlet/outlet end;

a first control valve having first and second ports;

said first control valve being movable between open and closed positions;

a second control valve having first and second ports;

said second control valve being movable between open and closed positions;

said second port of said first control valve being in fluid communication with said air inlet/outlet end of said first auxiliary air reservoir;

said second port of said second control valve being in fluid communication with said air inlet/outlet end of said second auxiliary air reservoir;

a first height control valve operatively interconnected to one of the frame members and the axle;

said first height control valve having air inlet and air outlet ends;

said air inlet of said first height control valve being in fluid communication with the source of air under pressure;

a second height control valve operatively interconnected to the other of said frame members and the axle;

said second height control valve having air inlet and air outlet ends;

a first air dump valve having a first port, a second port and an exhaust port;

said first port of said first air dump valve being in fluid communication with said air outlet end of said first height control valve;

said second port of said first air dump valve being in fluid communication with said air inlet/outlet port of said first air spring and said first port of said first control valve;

a second air dump valve having a first port, a second port and an exhaust port;

said first port of said second air dump valve being in fluid communication with said air outlet end of said second height control valve;

said second port of said second air dump valve being in fluid communication with said air inlet/outlet port of said second air spring and said first port of said second control valve;

each of said first and second air dump valves being movable between first and second positions;

said first air dump valve, when in its said first position, permitting fluid communication between said outlet end of said first height control valve, said air inlet/outlet end of said first air spring and said first port of said first control valve;

said exhaust port of said first air dump valve being closed when said first air dump valve is in its said first position;

said first air dump valve, when in its said second position, permitting the air in said first air spring to be exhausted therefrom through said exhaust port of said first air dump valve;

said first port of said first air dump valve being closed when said first air dump valve is in its said second position;

said second air dump valve, when in its said first position, permitting fluid communication between said outlet end of said second height control valve, said air inlet/outlet end of said second air spring and said first port of said second control valve;

said exhaust port of said second air dump valve being closed when said second air dump valve is in its said first position;

said second air dump valve, when in its said second position, permitting the air in said second air spring to be exhausted therefrom through said exhaust port of said second air dump valve;

said first port of said second air dump valve being closed when said second air dump valve is in its said second position;

said first control valve being closed thereby preventing the air in said first auxiliary air reservoir from being exhausted therefrom when said first air dump valve is in its said second position;

said second control valve being closed thereby preventing the air in said second auxiliary air reservoir from being exhausted therefrom when said second air dump valve is in its said second position;

said first control valve being open thereby permitting the flow of air therethrough when said first air dump valve is in its said first position;

said second control valve being open thereby permitting the flow of air therethrough when said second air dump valve is in its said first position.

* * * * *